Patented Apr. 29, 1924.

1,492,412

UNITED STATES PATENT OFFICE.

JAMES ASTON, OF PITTSBURGH, PENNSYLVANIA, ASSIGNOR TO A. M. BYERS COMPANY, OF PITTSBURGH, PENNSYLVANIA, A CORPORATION OF PENNSYLVANIA.

ALLOY WROUGHT IRON AND METHOD OF MAKING THE SAME.

No Drawing. Application filed June 8, 1921. Serial No. 476,021.

*To all whom it may concern:*

Be it known that I, JAMES ASTON, a citizen of the United States, residing at Pittsburgh, in the county of Allegheny and State of Pennsylvania, have invented a new and useful Improvement in Alloy Wrought Iron and Methods of Making the Same, of which the following is a full, clear, and exact description.

My invention relates to wrought iron, and particularly to wrought iron made in accordance with my U. S. Letters Patent No. 1,370,622, granted March 8, 1921, for method of making wrought iron; or in accordance with my U. S. Letters Patent 1,412,823 granted April 18, 1922, for methods of making wrought iron, and 1,413,513 granted April 18, 1922, for processes of making wrought iron.

In these processes, the product of a steel-making operation is comminuted either before or upon entering a slag bath having puddling characteristics, the granulated metal mixing with the slag and forming a coherent mass of mixed metal and slag.

I have discovered that in the use of such processes I can use an alloy steel or alloyed product of a steel-making operation, and thereby obtain increased desirable characteristics in the wrought iron produced. For example, I may add to the steel a small percentage of copper, say .25 per cent, to increase the non-corrosive characteristics of the wrought iron product. Or I may add vanadium, nickel, titanium, chromium, or manganese, either singly or in combination with others. These are preferably added to the steel as in the ordinary process of making alloy steels, and the steel is then converted into wrought iron.

I thus obtain a wrought iron having not only the characteristics of the highest grade of wrought iron with more uniform slag distribution than any ordinary hand-puddled wrought iron; but the product also possesses additional valuable characteristics owing to the use of the alloyed steel or alloyed product of the steel-making operation. The alloying material may be added as a pure metal or as a ferro-alloy. It may be added to give the wrought iron additional valuable characteristics, such as resistance to shocks or vibrations, additional strength, etc.

The advantages of my invention will be obvious to those skilled in the art, since the product is increased in value, either as regards anti-corrosive qualities, resistance to shocks or strains, or other characteristics obtained by alloying the steel.

The alloying material may be added at any proper stage of the steel-making process, or thereafter, previous to granulating; the alloying metals may be varied as well as their percentages; and other variations may be made without departing from my invention, I consider myself the first to make a true alloy wrought iron containing ingredients which are more oxidizable than the iron under the conditions occurring where the granulated product of a steel-making operation is mixed with molten slag.

I claim:

1. An alloy wrought iron containing slag an alloying ingredient which is more oxidizable than the iron under the conditions occurring where the granulated product of a steel-making operation is mixed with molten slag.

2. An alloy wrought iron containing slag, and also containing more than .15 per cent of an alloying ingredient, which is more oxidizable than the iron, under the conditions occurring where the granulated product of a steel making operation is mixed with molten slag.

3. An alloy wrought iron containing slag, and also containing more than .15 per cent of an alloying metal, which is more oxidizable than iron, under the conditions occurring where the granulated product of a steel making operation is mixed with molten slag.

4. In the manufacture of wrought iron, the steps consisting of granulating the alloyed product of a steel-making operation, mixing the same with slag, and forming a coherent ball or mass of the mixed metal and slag.

5. In the manufacture of wrought iron, the steps consisting of subjecting iron to a steel-making operation adding an alloying ingredient, pouring the same while molten into a bath of slag of puddling characteristics, and granulating the metal and forming a mixed coherent mass of metal and slag.

6. In the manufacture of wrought iron, the steps consisting of adding an alloying ingredient to the product of a steel-making operation, granulating the said alloyed product, mixing the same with slag and forming a coherent ball or mass of the mixed metal and slag.

In testimony whereof, I have hereunto set my hand.

JAMES ASTON.